Nov. 18, 1969     W. SCHMUDE ET AL     3,478,402
METHOD OF MAKING A WIRE RACE FOR ANTIFRICTION BEARINGS
Filed Sept. 13, 1966     4 Sheets-Sheet 1
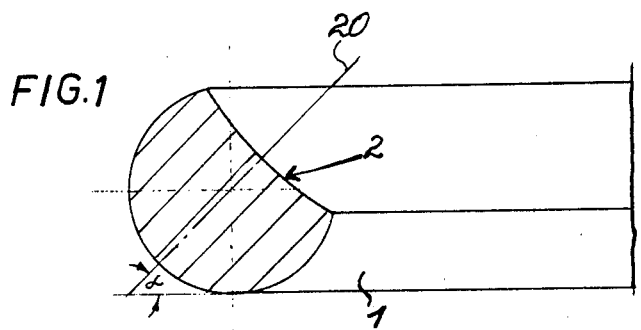
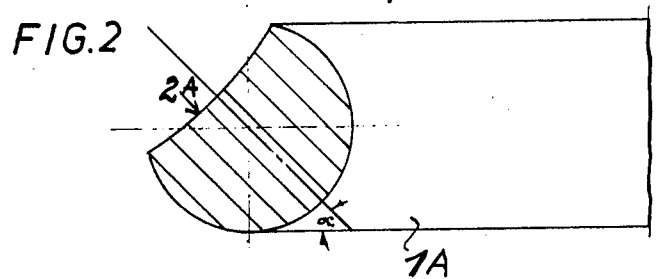
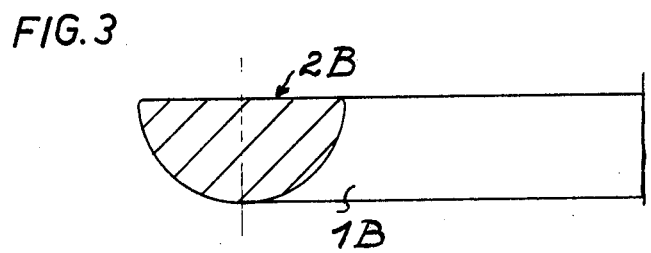
INVENTORS
Wolfgang Schmude
Heinz Pökler
by Michael S. Striker INVENTORS
Wolfgang Schmude
Heinz Pöhler
by
Michael J. Striker United States Patent Office 3,478,402
Patented Nov. 18, 1969

3,478,402
METHOD OF MAKING A WIRE RACE FOR
ANTIFRICTION BEARINGS
Wolfgang Schmude, Langenfeld, and Heinz Pöhler, Herdecke-Kirchenende, Germany, assignors to Eisenwerk Rothe Erde G.m.b.H., Dortmund, Germany
Filed Sept. 13, 1966, Ser. No. 579,093
Claims priority, application Germany, Sept. 13, 1965,
E 30,084
Int. Cl. B21h 1/12; B21k 1/04
U.S. Cl. 29—148.4                8 Claims

ABSTRACT OF THE DISCLOSURE

A process for the production of wire races for antifriction bearings which a wire of generally circular cross-section is provided with a track portion by drawing the wire through a drawing die and in which at least a portion of the wire is formed into an annular race of predetermined diameter with the track portion forming an annular track of constant bearing contact angle.

---

The present invention relates to antifriction bearings in general, and more particularly to improvements in antifriction bearings of the type wherein spherical, cylindrical or otherwise configurated rolling elements travel in an endless path defined by two or more annular races consisting of metallic wire. Still more particularly, the invention relates to a process for the production of profiled wire races of antifriction bearings.

A wire race must be provided with one or more tracks in the form of concave convex or flat annular surfaces along which the rolling elements travel. In accordance with a presently prevailing method, such tracks are formed by the rolling elements themselves by installing a set of metallic wire races of truly circular cross-sectional outline in the rings of an antifriction bearing and by causing an annulus of spherical rolling elements to travel along the races under heavy load so that they automatically deform the races and provide such races with tracks. The rings must be reset several times in the course of such deforming operation so that the latter consumes considerable time because the races must be deformed slowly. The just outlined conventional shaping of wire races is satisfactory only if the width of tracks does not exceed one-third of the diameter of the original wire; otherwise, the rolling elements will provide the races with seams or burrs which extend beyond the track and affect the quality of the anti-friction bearing.

It is also known to provide wire races with tracks by removing material from originally round steel wires in a grinding or analogous material removing machine. Such treatment produces large quantities of waste and results in uncontrolled distribution of internal stresses so that the wire must be readjusted again and again during grinding in order to insure that it will later assume a truly annular shape. The grinding disks which are used for such removal of material undergo considerable wear because the wires normally consist of high-quality steel stock.

Accordingly, it is an important object of the present invention to provide a novel and inexpensive process for the production of wire races for use in antifriction bearings according to which the races are produced with a minimum of waste.

Another object of the invention is to provide a process of the just outlined characteristics which insures that the distribution of internal stresses is uniform in each zone of the wire race.

The process of the present invention comprises the steps of drawing a length of metallic wire having a circular cross-sectional outline of selected diameter to provide such wire with one or more tracks along which the rolling elements of the assembled antifriction bearing travel, and converting the thus drawn wire into an annular race of predetermined diameter and constant bearing contact angle. The bearing contact angle is the angle enclosed by the line drawn through the point of contact of rolling elements and the track with the general plane of the annular wire race.

The drawing step may include coiling up the wire and the converting step then comprises subdividing the wire into annuli and joining the ends of such annuli. Alternatively, the drawing step may comprise cold-drawing the wire through a die to produce a length of straight profiled wire with one or more tracks, and the converting step then comprises subdividing the resulting straight wire into sections of predetermined length and bending such sections to form annuli of desired diameter. The material of the wire may be hardened subsequent to cold-drawing and conversion into an annulus, particularly if the diameter of the wire is relatively large.

It will be seen that, by the simple expedient of drawing an originally round wire to obtain a profiled wire with one or more flat, concave or convex annular tracks the process of the present invention will furnish wire races without any waste in expensive material and with more uniform distribution of internal stresses.

The novel features which are considered as characteristic of the invention are set forth in particular in the appended claims. The improved wire race itself, however, both as to its utilization in various types of antifriction bearings and the process of making the same, together with additional features and advantages thereof, will be best understood upon perusal of the following detailed description of certain specific embodiments with reference to the accompanying drawings, in which:

FIG. 1 is an axial section through a portion of a wire race which embodies one form of the present invention;

FIG. 2 is a similar axial section through a portion of a second wire race;

FIG. 3 is an axial section through a portion of a third wire race;

Figure 4:
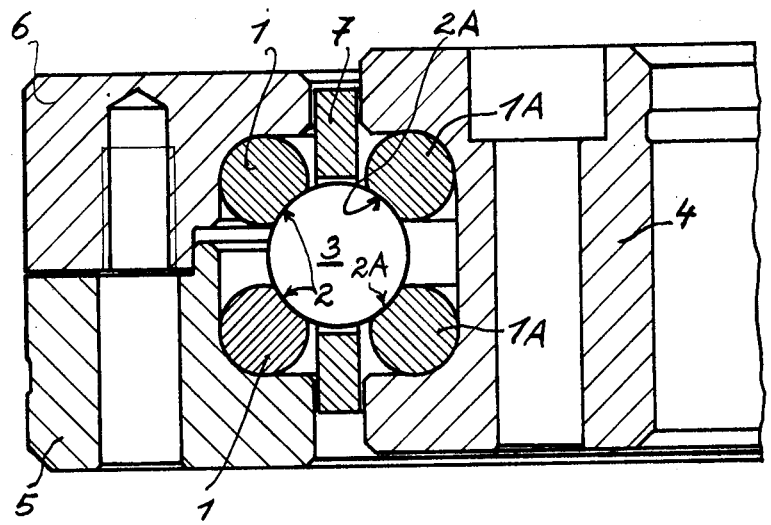
FIG. 4 is a fragmentary axial section through a radial antifriction bearing which comprises wire races of the type shown in FIGS. 1 and 2.

Referring to the drawings in detail, and first to FIG. 1, there is shown a portion of an annular outer wire race 1 which consists of profiled steel wire and has a single annular track 2 of concave outline. Such race can be used, for example, in a radial antifriction bearing of the type shown in FIG. 4 which comprises an inner ring 4, an outer ring including two annnular sections 5, 6, a single ring or annulus of spherical rolling elements 3, an annular cage 7 for the rolling elements, two outer wire races 1, and two inner wire races 1A having annular tracks 2A of concave outline. A portion of one of the inner races 1A is shown in FIG. 2.

Figure 6:
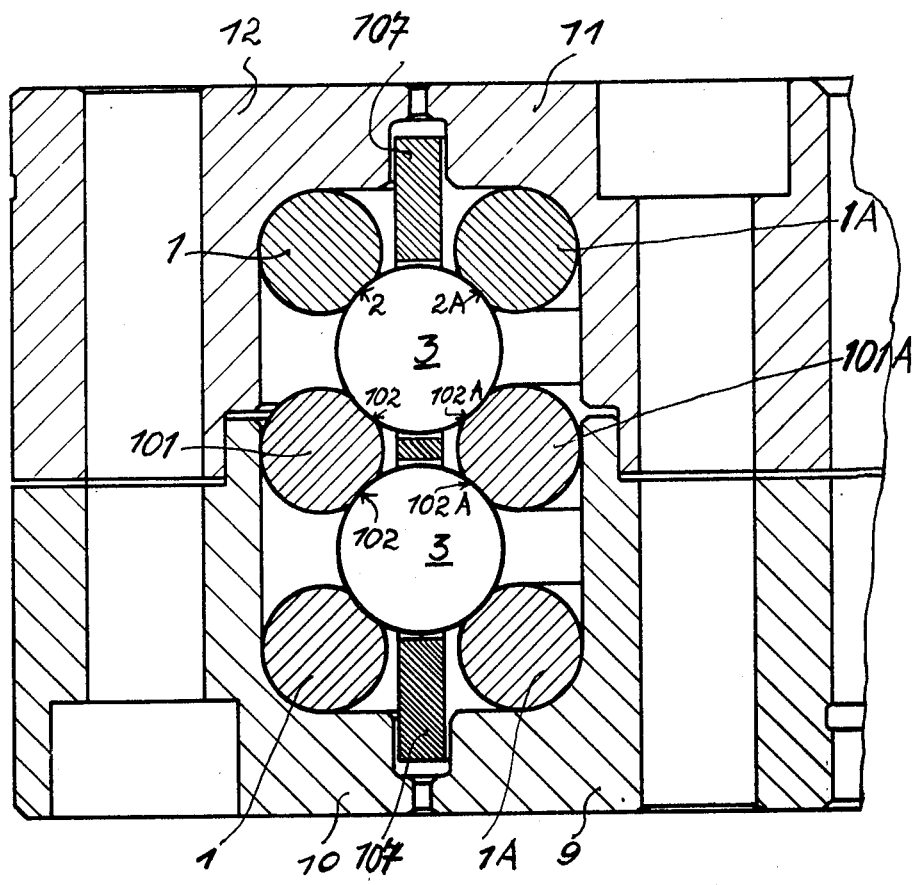
FIG. 6 is a fragmentary axial section through a duplex antifriction bearing utilizing wire races of the type shown in FIGS. 1 and 2 and additional wire races each of which is provided with two tracks.

FIG. 6 shows a duplex radial antifriction bearing with an inner ring including two annular sections 9, 11, an outer ring including two annular sections 10, 12, two annuli of spherical antifriction rolling elements 3, two outer wire races 1, two inner wire races 1A, a median outer wire race 101 with two tracks 102, and a median inner wire race 101A with two tracks 102A. The numeral 107 denotes a duplex cage for the two annuli of rolling elements 3.

Figure 5:
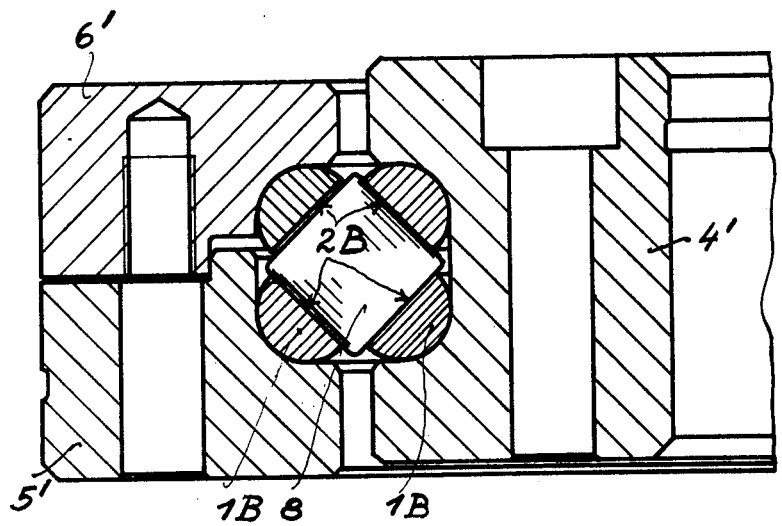
FIG. 5 is a fragmentary axial section through an antifriction bearing with cylindrical rolling elements and utilizing four wire races of the type shown in FIG. 3.

The wire race 1B of FIG. 3 is of substantially semicircular cross-sectional outline and is provided with a single flat annular track 2b. Such races may be used in antifriction bearings with non-spherical rolling elements, for example, with cylindrical rolling elements 8 of the type shown in FIG. 5. The bearing of FIG. 5 comprises an inner ring 4', a composite outer ring including two annular sections 5', 6', an annulus of cylindrical rolling elements 8, and four wire cages 1B each having a flat annular track 2B whose width equals the diameter of the respective wire race.

Figure 7:
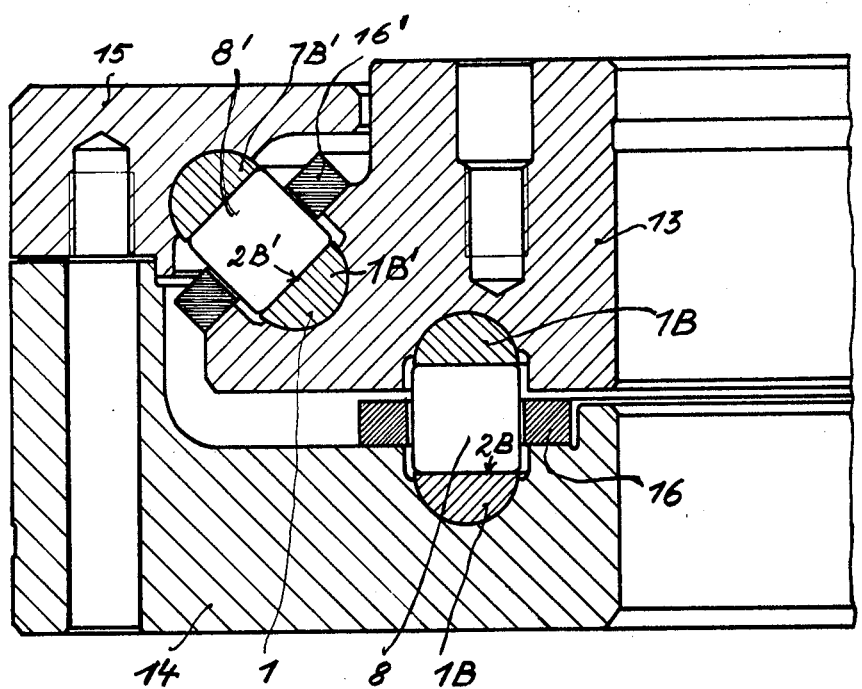
FIG. 7 is a fragmentary axial section through a radial thrust bearing utilizing two sets of wire races of the type shown in FIG. 3.

FIG. 7 shows a radial thrust bearing with three rings 13, 14, 15, two annuli of cylindrical rolling elements 8, 8', cages 16, 16', and two pairs of wire races 1B, 1B' respectively having tracks 2B and 2B'. The planes of the tracks 2B make an angle of 45 degrees with the planes of the tracks 2B'.

Referring again to FIG. 1, the angle alpha is the bearing contact angle and is enclosed by a line 20 passing through the point of contact of a rolling element 3 with the track 2 and the general plane of the annular race 1. The race is obtained by cold-drawing an originally round wire through a suitable drawing die (not shown) so that the die provides the wire with the track 2. This eliminates waste in metallic material and insures that the distribution of internal stresses is uniform in each portion of the ultimate product. Furthermore, cold-drawing of tracks 2 requires much less time and less complicated machinery than grinding or deformation by contact with rolling elements in accordance with the heretofore known processes. As stated before, cold-drawing may simultaneously result in coiling or winding of profiled wire. Such stock is then straightened and subjected to bending to a desired diameter. The bending is carried out in such a way that the track 2 is placed into a predetermined position of inclination as indicated by the angle alpha. The track will be located on the inside (FIG. 1) or on the outside (FIG. 2), depending upon whether the ultimate product is an outer race or an inner race. Similar procedure is followed if the wire is drawn through a die by means of conventional grippers to form a straight profiled wire with one or more tracks.

The profiled wire is bent in such a way that the axis of the moment of least resistance makes with the axis of the annular race an angle of between 0–90 degrees. A wire exhibits the tendency to bend about the axis of the moment of least resistance or inertia.

If the race of FIGS. 1, 2 or 3 is made of high-quality steel wire, it requires no treatment at all after the cold-drawing operation is completed. In other words, as soon as the profiled wire is converted into an annulus of desired diameter, it can be immediately assembled wtih one or more wire races in the rings of an axial or radial antifriction bearing. On the other hand, and if the wire consists of normal steel stock, and particularly if the stock has a relatively large diameter, cold-drawing and bending may be carried out while the material is soft and the resulting ring-shaped race is thereupon hardened, for example, by resorting to a continuous hardening method such as induction hardening. If the material of the wire is of the so-called separation hardenable type, the separation hardening step will also be carried out subsequent to bending.

Without further analysis, the foregoing will so fully reveal the gist of the present invention that others can, by applying current knowledge, readily adapt it for various applications without omitting features which fairly constitute essential characteristics of the generic and specific aspects of the above described contribution to the art, and therefore, such adaptations should and are intended to be comprehended within the meaning and range of equivalence of the following claims.

What is claimed as new and desired to be protected by Letters Patent is:

1. A process for the production of wire races for insertion into rings of antifriction bearings comprising the steps of drawing through a drawing die a length of metallic wire having a generally circular cross sectional outline to provide such wire with a track portion along which the rolling elements of the assembled bearing travel; and converting the thus drawn wire into an annular race of predetermined diameter with said track portion forming an annular track of constant bearing contact angle.

2. A process as set forth in claim 1, further comprising the step of hardening the material of the wire subsequent to completion of said converting step.

3. A process as set forth in claim 1, wherein said drawing step comprises forming the wire with a flat track portion.

4. A process as set forth in claim 1, wherein said drawing step comprises forming the wire with at least one concave or convex annular track portion.

5. A process as set forth in claim 1, wherein said track portion is formed by cold drawing the wire.

6. A process as set forth in claim 1, wherein a length of substantially straight profiled stock is produced by said drawing step, and wherein said converting step comprises subdividing the resulting straight stock into sections of predetermined length and bending each section to form an annulus of desired diameter.

7. A process as set forth in claim 6, wherein the wire is bent with said track portion extending at an angle to the axis of said annulus.

8. A process as set forth in claim 1, wherein a plurality of track portions are simultaneously formed during the drawing step.

References Cited

UNITED STATES PATENTS

| | | | |
|---|---|---|---|
| 2,036,034 | 3/1936 | Fulmer et al. | 29—417 |
| 2,399,847 | 5/1946 | Bauersfeld | 308—216 |
| 2,917,351 | 12/1959 | Franke et al. | |
| 3,081,135 | 3/1963 | Olson | 308—195 |
| 3,099,073 | 7/1963 | Olson | 308—216 X |
| 3,141,230 | 7/1964 | Pohler et al. | 29—148.4 |
| 3,229,353 | 1/1966 | Morrison | 29—148.4 |
| 3,370,333 | 2/1968 | Gibson | 29—148.4 |

THOMAS H. EAGER, Primary Examiner

U.S. Cl. X.R.

29—417; 72—467; 308—195, 216